Figure 1:
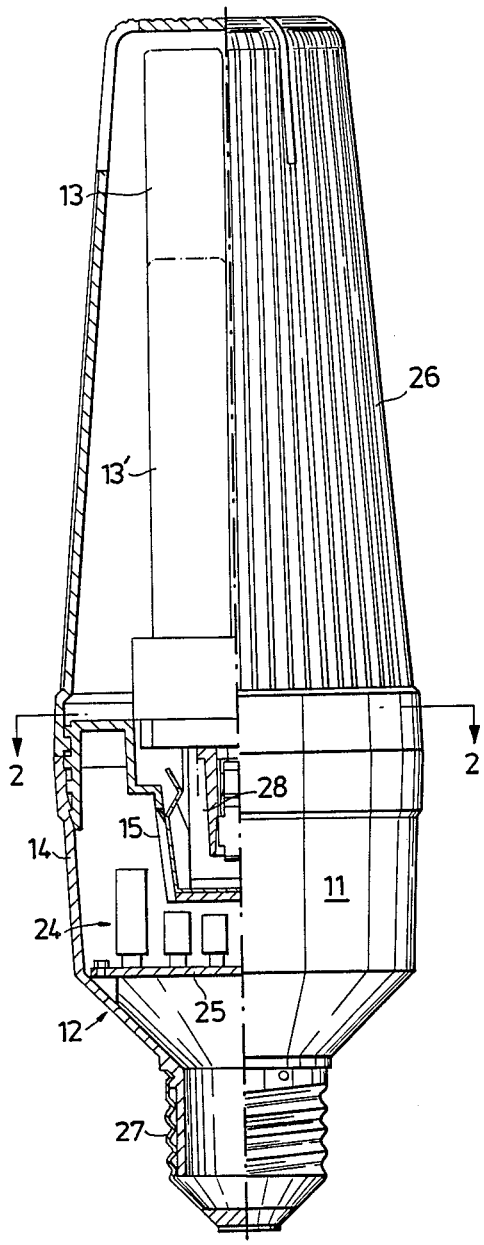

United States Patent [19]

Linnman et al.

[11] Patent Number: 4,761,585

[45] Date of Patent: Aug. 2, 1988

[54] FITTING FOR COMPACT ELECTRIC DISCHARGE LAMPS

[75] Inventors: Sven N. J. Linnman, Åkersberga; Ake Björkman, Karlskrona, both of Sweden

[73] Assignee: Lumalampan AB, Karlskrona, Sweden

[21] Appl. No.: 917,794

[22] Filed: Oct. 10, 1986

[30] Foreign Application Priority Data

Nov. 5, 1985 [SE] Sweden ............................... 8505213

[51] Int. Cl.⁴ .......................................... H05B 41/29
[52] U.S. Cl. ..................................... 315/309; 315/50;
315/58; 315/118
[58] Field of Search .................. 315/309, 50, 58, 118,
315/307, 308

[56] References Cited

U.S. PATENT DOCUMENTS

| | | | |
|---|---|---|---|
| 4,060,752 | 11/1977 | Walker | 315/307 |
| 4,134,042 | 1/1979 | Van Heemskerck | 315/53 |
| 4,170,747 | 10/1979 | Holmes | 315/22 X |
| 4,258,293 | 3/1981 | Judge et al. | 315/58 |
| 4,358,717 | 11/1982 | Elliott | 315/58 |
| 4,366,416 | 12/1982 | Yokoyama | 315/309 |
| 4,516,054 | 5/1985 | Shikama et al. | 315/309 |
| 4,549,115 | 10/1985 | Kolm | 315/309 |
| 4,623,823 | 11/1986 | Engel | 315/58 |

Primary Examiner—David K. Moore
Assistant Examiner—Mark Powell
Attorney, Agent, or Firm—Roylance, Abrams, Berdo & Goodman

[57] ABSTRACT

A fitting for the electrical connection and support of compact electric-discharge lamps of different powers and construction. An electrical series impedance device for the normal operation of the lamps is accommodated in the fitting. These devices also include a resistor (47, 48) which is responsive to the glow current of the lamps and which is arranged to maintain the glow current in the various lamps to which it may be fitted at substantially one and the same level. This is achieved by the fact that the resistor is temperature-responsive and is placed in good thermal contact with a distinct heat source, for example, the series choke (38).

13 Claims, 2 Drawing Sheets

FITTING FOR COMPACT ELECTRIC DISCHARGE LAMPS

The present invention relates to a fitting for compact electric-discharge lamps, such as compact low pressure mercury vapour discharge lamps, hereinafter referred to generally as compact luminescent lamps, of the kind which include electric series-impedance circuits for the normal function of the lamp.

Compact luminescent lamps have been known to the art for some years. Such lamps comprise tubular elements having a diameter of 10-15 mm and carried by specially constructed bases. In order to make such lamps as compact as possible, the tubular elements are often in the form of a single or a double U. Lamps of this kind are found described, for example, in Patent Application EP 0061758 and GB 2077400. There are at present a number of different compact fluorescent lamps available which are intended for outputs of between 5 and 13 Watts. The bases and fittings of these lamps have been designed so that a given type of lamp will only fit one or a few fittings. This has been necessary in order to avoid confusion between lamps of different powers, since despite having the same glow current or operational current, the lamp all have different glow potentials. A common feature of the series-impedance circuits provided in present day fittings is that the operational current, or glow current, passing through the lamp is influenced by the glow potential of the lamp. This means that a given series-impedance circuit can only be used together with one type of compact luminescent lamp.

One object of the present invention is therefore to provide a fitting which is mechanically and electrically suitable to receive compact luminescent lamps of mutually different powers. This object and further objects of the invention, together with advantages afforded thereby, will be apparent from the following description, and are achieved by means of the present invention having the characteristic features set forth in the following claims.

In accordance with the invention, the fitting incorporates control means for maintaining the glow current in mutually different compact luminescent lamps at substantially the same level, despite the fact that the lamps all have different glow potentials, as before mentioned. More specifically there is used only one or a few inexpensive temperature-responsive resistors, which are placed in good thermal contact with a selected component of the series-impedance circuit whose temperature is dependent practically solely upon the glow current. One such component is the series-choke, which is a standard component found in all such series-impedance circuits and through which the glow current of the lamp flows. The electrical losses in this choke are substantially proportional to the sqaure of the glow current. This means that the rise in temperature of the choke is also proportional to the square of the glow current. The choke temperature is thus a distinctive measurement of the current flowing through the lamp.

Hereinafter the current at which the lamp is intended to glow will be referred to as the nominal glow current. The choke temperature at nominal glow current is referred to as the nominal temperature. The resistor chosen is suitably one whose resistance varies greatly when subjected to temperatures lying in the proximity of the nominal choke temperature. The resistance of the resistor is chosen so that it causes the series-impedance circuit to produce higher glow currents at temperatures which lie immediately beneath the nominal temperature, and so that it causes the current to decrease when the temperature rises above the nominal temperature.

The temperature-responsive resistor shall have a positive temperature coefficient in the series-impedance circuit, the current output of which decreases with increasing resistance. The temperature coefficient shall be negative, however, when the current output of the series-impedance circuit increases with increased resistance. In other respects the series-impedance circuit is dimensioned to produce nominal operating currents for lamps such as those having the high glow potential.

The mechanical constructions of the fitting is suitably adapted to accommodate frequency occurring compact lamp bases, so that lamps of different types and powers can be readily fitted to the fitting. Thus, the mechanical and electrical construction of the fitting has enabled its area of use to be widened considerably, without requiring excessively complicated and expensive measures to be taken. This is particularly important in the case of adapters of the kind devised to enable the connection of compact luminescent lamps to conventional standardized incandescent-lamp fittings, since lamp mounting provided with such fittings are normally intended for incandescent lamps of highly varying luminance.

Figure 2:
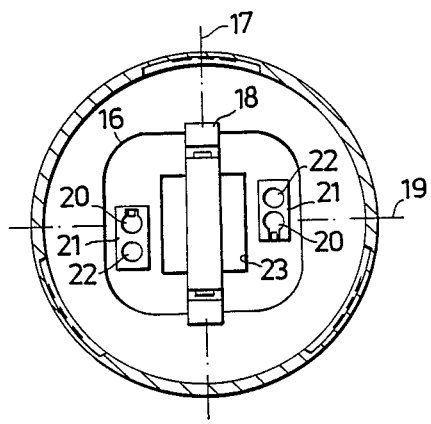
Figure 3:
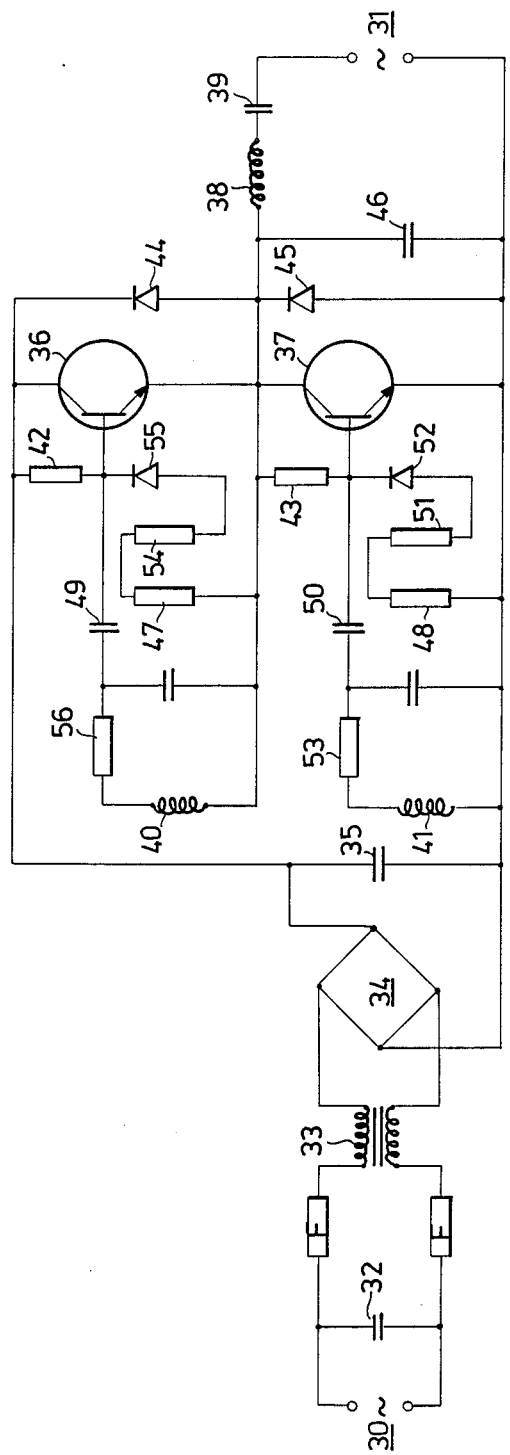

The invention will now be described in more detail with reference to the accompanying drawings, in which FIG. 1 is a side view, partly in section, of a fitting according to the invention;

FIG. 2 is a cross-section of the fitting illustrated in FIG. 1, taken along the line 2—2; and FIG. 3 is a circuit diagram of a series-impedance circuit incorporated in the fitting illustrated in FIG. 1.

In the illustrated embodiment, the fitting according to the invention is incorporated in an adapter 12 intended for adapting a compact luminescent lamp 13 to fit conventional incandescent lamp fittings. The fitting 11 includes a coupling housing 14 and a holder 15, which projects centrally into the coupling housing to hold and electrically connect the lamp to the fitting. The holder has an elongated rectangular or square basic shape with rounded corners 16 and a U-shaped holder spring 18 positioned along a first centre line 17. Arranged along a second centre line 19, which extends at right angles to two mutually opposing sides of the holder, is a first pair of contacts 20 which are in electrical contact with a second pair of contacts 22 via a metal connector-tap 21. Located in the centre of the holder is a square recess 23 which is intended to accommodate the square central part normally found on the base 28 of the lamp. The coupling housing 14 also houses the electric series-impedance circuit 24 necesssary to the normal function of the lamp. The series-impedance circuit, which includes inter alia a frequency converter for converting mains frequency to a high frequency of about 30 KHz, is constructed on a circular circuit card 25 mounted in the lower part of the coupling housing 14. A transparent casing 26 is detachably connected to the coupling housing 14 and encloses tubes 13 and 13' of mutually different size. A conventional incandescent-lamp base 27 is fitted to the side of the housing remote from the lamp casing 26.

A series-impedance circuit suitable for this type of fitting is illustrated in FIG. 3. This circuit is effective to convert the input low-frequency mains voltage 30 to a high-frequency a.c. voltage at terminal 31 of the lamp.

The series-impedance circuit includes, in a known manner, a mains-interference filter comprising a capacitor 32 and a choke 33, a rectifying bridge 34 and a smoothing capacitor 35. The rectified mains voltage appearing across the smoothing capacitor is chopped or hacked by the switch transistors 36, 37 and the high-frequency a.c. voltage occurring therewith at the junction point between the transistors is fed to the lamps at 31, via a series choke 38 and a capacitor 39. The series choke has been provided with two additional coils or windings 40, 41, which deliver base current to the transistors 36 and 37 respectively. The arrangement is self-oscillating and starts when a respective resistor 42, 43 places the transistor bases in a suitable working mode, i.e. when causing a voltage to be applied to the transistors such as to cause them to act as amplifiers, whereupon the self-oscillating can commence. Diodes 44 and 45 function as free-wheel diodes for respective transistors 36 and 37. A capacitor imparts a suitable curve shape to the high-frequency a.c. voltage.

A temperature-responsive resistor 47, 48 is connected in the base circuit of respective transistors 36, 37 in the transistor hacker in order to influence the base current and therewith the pulse width. The duration of the time period over which alternate transistors are conductive is determined by capacitors 49, 50 which also form part of the self-oscillating circuit. For example, when the transistor is non-conducting, the capacitor 50 is re-charged via the temperature-responsive resistor 48, a first resistor 51, a didoe 52, a second resistor 53 and an additional coil 41 in the series-choke 38. The lower the resistance in the circuit, the faster the capacitor can be re-charged during said time period and the longer the subsequent period of conductivity in the transistor 37. In a similar manner, re-charging of the capacitor 49 and the subsequent conductivity time of the transistor 36 is determined by the temperature-responsive resistor 47, a first resistor 54, a diode 55, a second resistor 56 and the additional coil 40. The increasing periods over which the transistors are conductive result in lower frequency, which in turn results in a higher current through the series-choke 38 and therewith a higher current through the lamp. Thus, a low resistance in the temperature-responsive resistor 47, 48 results in a higher current through the lamp. The illustrated exemplifying embodiment thus assumes that the resistors 47, 48 have a positive temperature coefficient. They are suitably mounted so as to be in good thermal contact with the choke 38.

The components of the series-impedance circuit are dimensionsed to deliver a nominal operational current for that type of lamp, e.g. 13–20 Watts, which produces the highest glow potential. Normally no protective function is installed for this type of lamp. When a lamp of lower glow potential, down to 4–5 Watts, is connected-up, the following takes place; when the device is started, the operational current will be higher than the nominal current, due to the low glow potential of the lamp. The high glow current causes the temperature of the series-choke to increase relatively rapidly. When the temperature of the choke, and therewith also the temperature of the temperature-responsive resistor, has reached the nominal temperature, the resistance of the resistor increases rapidly, whereupon the series-impedance device is influenced in a manner which causes the glow current to decrease. The glow current will continue to decrease as the temperature of the choke increases. This increase in temperature, however, will cease when the glow current has fallen to a value in the vicinity of the nominal operational current. Consequently, the glow current is also stabilized at a value close to the nominal value.

The voltage between the base-circuits of the two transistors in this type of transistor hacker is high, about 300 volts. If the two base circuits were to be controlled from one and the same resistor, the remaining components of the base circuits would need to withstand high voltages, which would make the components extremely expensive.

In a series-resistance circuit in which the glow current increases with increasing resistance, there is used a temperature-responsive resistor having a negative temperature coefficient. This circuit functions in a manner analogous with the aforedescribed circuit.

In addition to the series choke the series-impedance circuit also incorporates other components whose temperatures are dependent upon the glow current in the lamp. One of these is the mains-interference filter 33, although the current passing through the filter, and therewith the extent to which the filter is heated, is also influenced by the mains voltage and thus not solely by the glow current. Other such components include the transistors 36, 37, although the extent to which these transistors are heated is influenced simultaneously by the current-amplification factors of respective transistors and switching losses. These parameters vary radically from type to type and from case to case, and hence the temperature to which the transistors are heated is not solely dependent upon the glow current. Consequently, the most suitable component to select as a heat source for the temperature-responsive resistors is the series choke 38. Naturally, the choke will also provide the highest thermal losses, and therewith the highest temperature variation, which renders it the most suitable choice of heat source in the present context. The invention is not restricted to the described embodiments, and various modifications can be made within the scope of the following claims.

We claim:

1. A fitting for compact electric-discharge lamps, comprising an electric series-impedance device for the normal function of the lamp, wherein the fitting is constructed for lamps of difference powers and incorporates control means effective to maintain the glow current of the different lamps to which it may be fitted at substantially one and the same level, wherein said control means include a temperature-responsive resistor; and resistor is placed in good thermal contact with one component whose temperature is dependent on the glow current, wherein a transistor is included in the series-impedance device, and said resistor is placed in good thermal contact with the transistor.

2. A fitting according to claim 1, wherein said different powers of said lamps are in the range of 4–20 watts.

3. A fitting according to claim 1, wherein said control means include two or more of said temperature-responsive resistors.

4. A fitting according to claim 1, including a substantially rectangular holder for the base of a respective lamp; and two pairs of terminal contacts arranged firstly along a center line extending at right angles to one side of the holder, and secondly diagonally to said center line for connecting different bases to the series-impedance device.

5. A fitting according to claim 1, wherein the series-impedance circuit includes a transistor hacker, and said temperature-responsive resistor is arranged to influence the pulse width in the transistor hacker.

6. A fitting according to claim 5, wherein said resistor is coupled in the base circuit of two or more transistors in the transistor hacker so as to influence the base current and therewith the pulse width.

7. A fitting for compact electric-discharge lamps, comprising an electric series-impedance device for the normal function of the lamp, wherein the fitting is constructed for lamps of difference powers and incorporates control means effective to maintain the glow current of the different lamps to which it may be fitted at substantially one and the same level, wherein said control means include a temperature-responsive resistor; said resistor is placed in good thermal contact with one component whose temperature is dependent on the glow current, wherein a series choke is included in the series-impedance device, and said resistor is placed in good thermal contact with the series choke.

8. A fitting according to claim 7, wherein said different powers of said lamps are in the range of 4–20 watts.

9. A fitting according to claim 7, wherein said control means include two or more of said temperature-responsive resistors.

10. A fitting according to claim 7, including a substantially rectangular holder for the base of a respective lamp; and two pairs of terminal contacts arranged firstly along a center line extending at right angles to one side of the holder, and secondly diagonally to said center line for connecting different bases to the series-impedance device.

11. A fitting according to claim 7, wherein the series-impedance circuit includes a transistor hacker, and said temperature-responsive resistor is arranged to influence the pulse width in the transistor hacker.

12. A fitting according to claim 11, wherein said resistor is coupled in the base circuit of two or more transistors in the transistor hacker so as to influence the base current and therewith the pulse width.

13. A fitting according to claim 11, wherein said transistor hacker includes two switching transistors, the base current of which is delivered from two additional coils in the series choke: and a temperature-responsive resistor is incorporated in the oscillating circuit of said resistor for controlling the base current.

* * * * *